United States Patent
Seo et al.

(10) Patent No.: US 8,662,762 B2
(45) Date of Patent: Mar. 4, 2014

(54) COMPACT LENS OPTICAL SYSTEM AND DIGITAL CAMERA MODULE INCLUDING THE SAME

(75) Inventors: Jung-pa Seo, Gwangmyeong-si (KR); Sung-cheol Bae, Suwon-si (KR); Jin-seon Seo, Jinju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 12/902,583

(22) Filed: Oct. 12, 2010

(65) Prior Publication Data

US 2011/0025866 A1    Feb. 3, 2011

Related U.S. Application Data

(63) Continuation-in-part of application No. 12/577,803, filed on Oct. 13, 2009, now Pat. No. 8,218,959, which is a continuation of application No. 11/974,874, filed on Oct. 16, 2007, now Pat. No. 7,667,897.

(30) Foreign Application Priority Data

Oct. 17, 2006  (KR) .................. 10-2006-0101030
Mar. 3, 2010  (KR) .................. 10-2010-0019030

(51) Int. Cl.
    *G03B 17/17*    (2006.01)
(52) U.S. Cl.
    USPC ....................................... 396/351
(58) Field of Classification Search
    USPC .......... 396/351, 352, 429, 432, 435; 348/344
    See application file for complete search history.

(56) References Cited

U.S. PATENT DOCUMENTS 5,940,126 A    8/1999  Kimura
6,456,327 B1   9/2002  Tsai
6,532,035 B1   3/2003  Saari et al.
(Continued)

FOREIGN PATENT DOCUMENTS

JP    02-262632 A    10/1990
JP    10-254055 A    9/1998
(Continued)

OTHER PUBLICATIONS

Notice of Allowance established for KR 10-2006-0101030 Mar. 18, 2013.
Office Action established for CN200710180848.7 Aug. 3, 2011.

*Primary Examiner* — W B Perkey
(74) *Attorney, Agent, or Firm* — Drinker Biddle & Reath LLP

(57) ABSTRACT

A dual lens optical system (OS) includes a photographing device, a first OS having a first reflection member and redirecting an optical axis of light representing an image of an object input from a first direction toward the photographing device, and a second OS having a second reflection member, redirecting an optical axis of light representing an image of an object input from a second direction toward the photographing device, and sharing at least one of optical elements of the first OS. The first and second OSs selectively redirect the image light from the first or second direction toward the photographing device. The photographing surface has a first region where the light representing the image of the object input through the first OS is formed, and a second region where light representing the image of the object input through the second OS is formed, have different sizes and are overlapped.

19 Claims, 13 Drawing Sheets

(56) References Cited

U.S. PATENT DOCUMENTS

| | | |
|---|---|---|
| 6,992,699 B1 | 1/2006 | Vance et al. |
| 7,667,897 B2 * | 2/2010 | Seo ............................... 359/672 |
| 8,218,959 B2 * | 7/2012 | Seo ............................... 396/72 |
| 2001/0017661 A1 | 8/2001 | Shono |
| 2009/0051804 A1 | 2/2009 | Nomura et al. |
| 2009/0122179 A1 | 5/2009 | Nomura et al. |
| 2011/0141339 A1 * | 6/2011 | Seo ............................... 348/344 |

FOREIGN PATENT DOCUMENTS

| | | |
|---|---|---|
| JP | 2000-089301 A | 3/2000 |
| JP | 2005-101729 A | 4/2005 |
| JP | 2006-064958 A | 3/2006 |
| JP | 2006-081089 A | 3/2006 |
| KR | 1993-0010597 A | 6/1993 |
| KR | 1995-0007036 B1 | 6/1995 |
| KR | 10-2005-0051861 | 6/2005 |

* cited by examiner (TELE MODE)

COMPACT LENS OPTICAL SYSTEM AND DIGITAL CAMERA MODULE INCLUDING THE SAME

CROSS-REFERENCE TO RELATED PATENT APPLICATIONS

This application is a continuation-in-part of U.S. patent application Ser. No. 12/577,803, filed on Oct. 13, 2009, which is a continuation of U.S. patent application Ser. No. 11/974,874, filed on Oct. 16, 2007, which issued as U.S. Pat. No. 7,667,897 on Feb. 23, 2010, which claims the benefit of Korean Patent Application No. 10-2006-0101030, filed on Oct. 17, 2006, in the Korean Intellectual Property Office, the disclosure of which is incorporated herein in its entirety by reference.

This application also claims the benefit of Korean Patent Application No. 10-2010-0019030, filed on Mar. 3, 2010, in the Korean Intellectual Property Office, the disclosure of which is incorporated herein in its entirety by reference.

BACKGROUND

The invention relates to a compact lens optical system and a digital camera module including the same, and more particularly, to a compact lens optical system suitable for a compact digital camera and a mobile communications device, and a digital camera module including the compact lens optical system.

As technology develops and consumers' desire increases, a digital camera module is required to be compact and simultaneously have various functions. In particular, according to the convergence of digital technologies, general digital still cameras and camera phones are additionally equipped with a motion picture photographing function that has belonged to camcorders. Recently, mobile communications devices such as camera phones capable of video calling and picture photographing by combining a wireless Internet communications function and a digital camera function.

In the existing communications electronic devices, different optical systems are used for photographing a still image and a motion picture. Thus, since a system is configured to use a photographing device for separately configured optical systems or the system is configured by increasing the number of photographing devices, manufacturing costs may be increased and miniaturization of the system may be difficult.

SUMMARY

Various embodiments of the invention provide a compact dual lens optical system having two lens optical systems respectively configured to photograph a still image and a motion picture while maintaining a compact size, and a digital camera module including the compact dual lens optical system.

According to an embodiment of the invention, there is provided a dual lens optical system including a photographing device, a first optical system having a first reflection member and that redirects an optical axis of light representing an image of an object input from a first direction toward the photographing device, and a second optical system having a second reflection member and that redirects an optical axis of light representing an image of an object input from a second direction toward the photographing device, and that shares at least one of optical elements of the first optical system, wherein the first and second optical systems selectively redirect the light representing the image of the object input from the first or second direction toward the photographing device, and a first region of a photographing surface where the light representing the image of the object input through the first optical system is formed and a second region of the photographing surface where the light representing the image of the object input through the second optical system is formed have different sizes and are overlapped with each other.

The second reflection member may be selectively moved to a first position or a second portion to redirect the light representing the image of the object input in the first or second direction toward the photographing device.

The second reflection member may be a prism having a reflection surface, in which an incident surface is an aspherical surface. The second reflection member may be arranged closest to the object in the second optical system to function as an incident lens. The opposite surface of the reflection surface of the second reflection member may be mirror-coated to reflect light coming in the opposite direction.

The second reflection mirror may be a movable reflection mirror having a reflection surface and an aspherical lens may be further arranged at a side of the movable reflection mirror close to the object in the second direction.

The reflection surface of the second reflection member may be smaller than a reflection surface of the first reflection member.

The reflection surface of the second reflection member may be smaller than a reflection surface of the first reflection member.

The second region may be in the first region.

The first optical system may include, in order from an object side to an image side along the optical axis, a first lens group having a first reflection member for redirecting light representing the object input from the first direction toward the photographing device, a second lens group having a negative refractive power, a third lens group having a positive refractive power, and a fourth lens group having a positive refractive power.

The first optical system may be a zoom optical system and, during zooming from a wide mode to a tele mode, the second lens group may move toward the photographing device and then toward the object, the third lens group may move toward the object, and the fourth lens group may move toward the photographing device, and the fourth lens group may perform focusing.

The second optical system may include, in order from the object side to the image side along the optical axis, a first lens group having a second reflection member for redirecting light representing the object input from the second direction toward the photographing device, a second lens group having a positive refractive power, and a third lens group having a positive refractive power.

The shared optical elements may be the third and fourth lens groups of the first optical system, and the third and fourth lens groups of the first optical system may be the second and third lens groups of the second optical system.

The second optical system may be a single focus optical system, and a focal length of the second optical system may be longer than a focal length of the first optical system in a wide mode and shorter than a focal length of the first optical system in a normal mode The second optical system may be used for photographing at least one of a motion picture and a still image.

The first direction and the second direction may face the opposite directions on axes that are not the same.

The first direction and the second direction may face the same direction on axes that are not the same.

A cover for selectively blocking light input from the first direction may be arranged at an object side of the first reflection member.

According to another embodiment of the invention, a digital camera module includes the above first and second optical systems, the first optical system being used in a still image photography mode and the second optical system being used in a motion picture photography mode.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EMBODIMENTS

Figure 1:
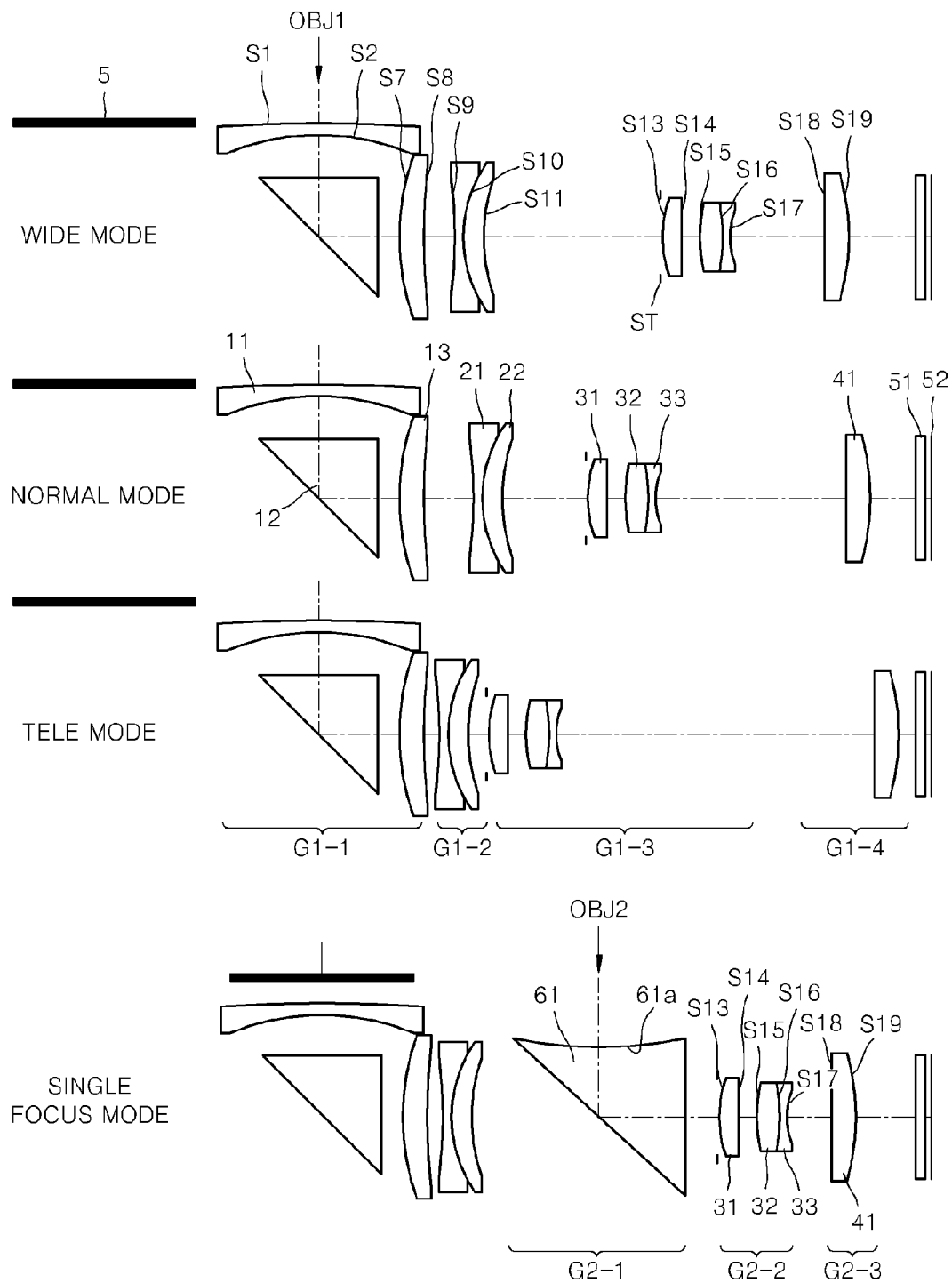
FIG. 1 is a pictorial diagram that schematically illustrates a dual lens optical system according to an embodiment of the invention, operating respectively in a wide mode, a normal mode, a tele mode, and a single focus mode.

The attached drawings for illustrating embodiments of the invention are referred to in order to gain a sufficient understanding of the invention, the merits thereof, and the objectives accomplished by the implementation of the invention. Hereinafter, the invention will be described in detail by explaining exemplary embodiments of the invention with reference to the attached drawings. Like reference numerals in the drawings denote like elements.

FIG. 1 schematically illustrates a dual lens optical system according to an embodiment of the invention, operating respectively in a wide mode, a normal mode, a tele mode, and a single focus mode. The dual lens optical system according to the present embodiment includes a first optical system and a second optical system. The first optical system may be a zoom lens optical system having a wide mode, a normal mode, and a tele mode. The second optical system may be a single focus optical system having a focal length between the normal mode and the tele mode of the first optical system.

The first optical system of the present embodiment includes, in order from an object side toward an image side along an optical axis, a first lens group G1-1, a second lens group G1-2, a third lens group G1-3, and a fourth lens group G1-4.

Figure 3:
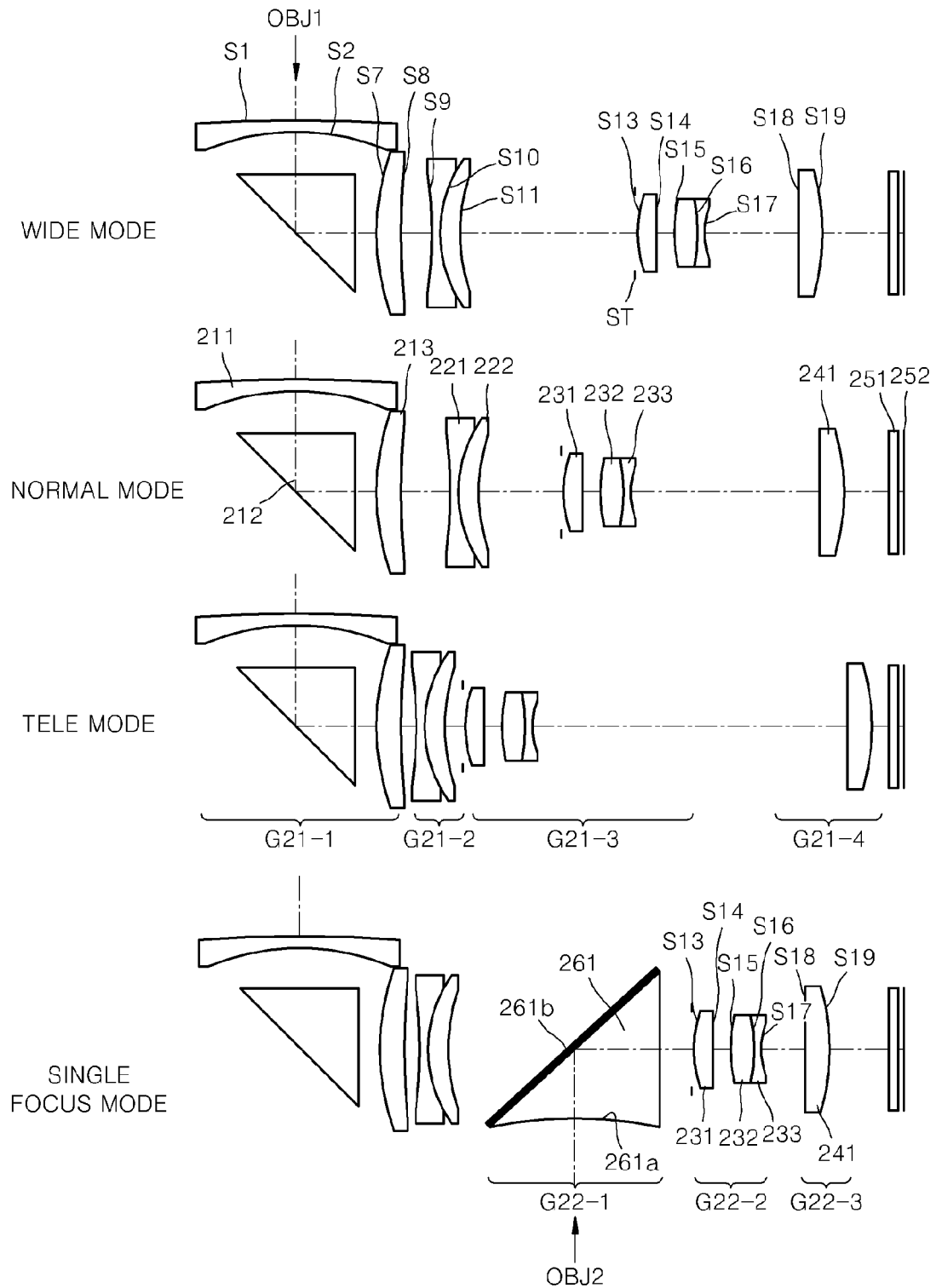
FIG. 3 is a pictorial diagram that schematically illustrates a dual lens optical system according to another embodiment of the invention, operating respectively in a wide mode, a normal mode, a tele mode, and a single focus mode.
Figure 10:
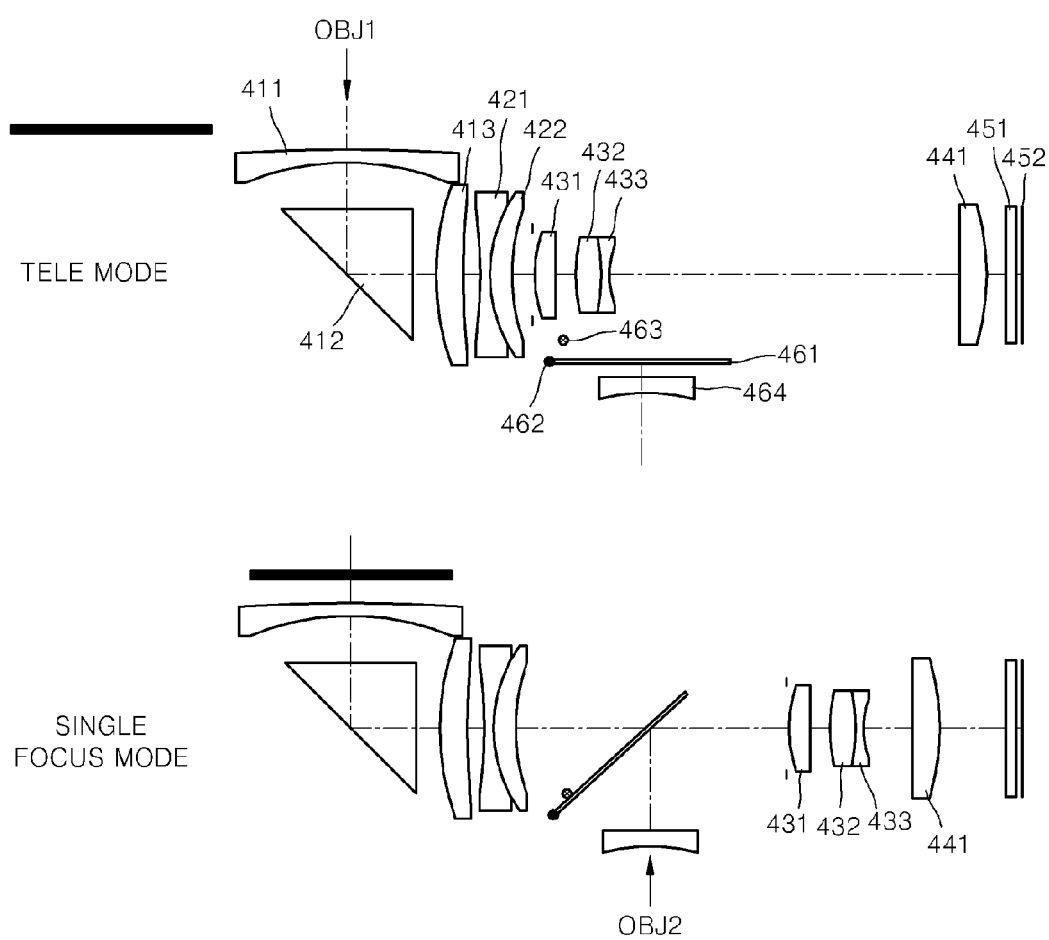
FIG. 10 is a pictorial diagram that schematically illustrates a dual lens optical system according to another embodiment of the invention, operating respectively in a wide mode, a normal mode, a tele mode, and a single focus mode.

The first lens group G1-1 may include an incident lens 11 that is a negative meniscus lens, a first reflection member 12, and a positive meniscus lens 13. The first reflection member 12 refracts the optical path of light representing the object from a first direction OBJ1, by 90°, to proceed toward a photographing device 52. Although in FIG. 1 the first reflection member 12 is illustrated as a right-angled prism, the first reflection member 12 may be a movable reflection mirror as illustrated in FIGS. 3 and 10.

In the present embodiment, the first lens group G1-1 has a negative refractive power. However, since the first lens group G1-1 has a low refractive power, the first lens group G1-1 may have a positive refractive power or a negative refractive power. The first lens group G1-1 is fixed during zooming from the wide mode to the tele mode.

The second lens group G1-2 has a negative refractive power. The second lens group G1-2 may include two units of lenses 21 and 22. The two lens units may be one unit of a double-concave lens 21 and one unit of a positive meniscus lens 22. The second lens group G1-2 moves toward a photographing device side and then back toward the object side during the zooming from the wide mode to the tele mode.

A stop ST is arranged between the second lens group G1-2 and the third lens group G1-3.

The third lens group G1-3 has a positive refractive power. The third lens group G1-3 may include three units of lenses 31, 32, and 33. The three lens units may be two units of first and second double-convex lenses 31 and 32 and one unit of a double-concave lens 33. The second double-convex lens 32 and the double-concave lens 33 are combined to each other to form a doublet lens that is useful to remove chromatic aberration. The third lens group G1-3 moves toward the object side during the zooming from the wide mode to the tele mode. Both sides of the first double-convex lens 31 are aspherical so that spherical aberration may be reduced.

The fourth lens group G1-4 has a positive refractive power. The fourth lens group G1-4 may be a double-convex lens 41. One side S19 of the double-convex lens 41 is aspherical. The fourth lens group G1-4 slightly moves from the object side toward the photographing device side during the zooming from the wide mode to the tele mode. The fourth lens group G1-4 may perform an auto focusing function. By setting the refractive power of the lens group closest to the photographing device side to be positive and arranging an aspherical surface, telecentricity that is required by a solid photographing device such as a charge coupled device (CCD) is made possible. That is, the incident angle of light incident on a peripheral portion of a photographing surface may be configured to be almost perpendicular to the photographing surface.

The first optical system is advantageous in miniaturization of an optical system because the first to fourth lens groups G1-1, G1-2, G1-3, and G1-4 minimize the entire length of the optical system and reduce the amount of movement of each lens group during zooming.

Figure 4:
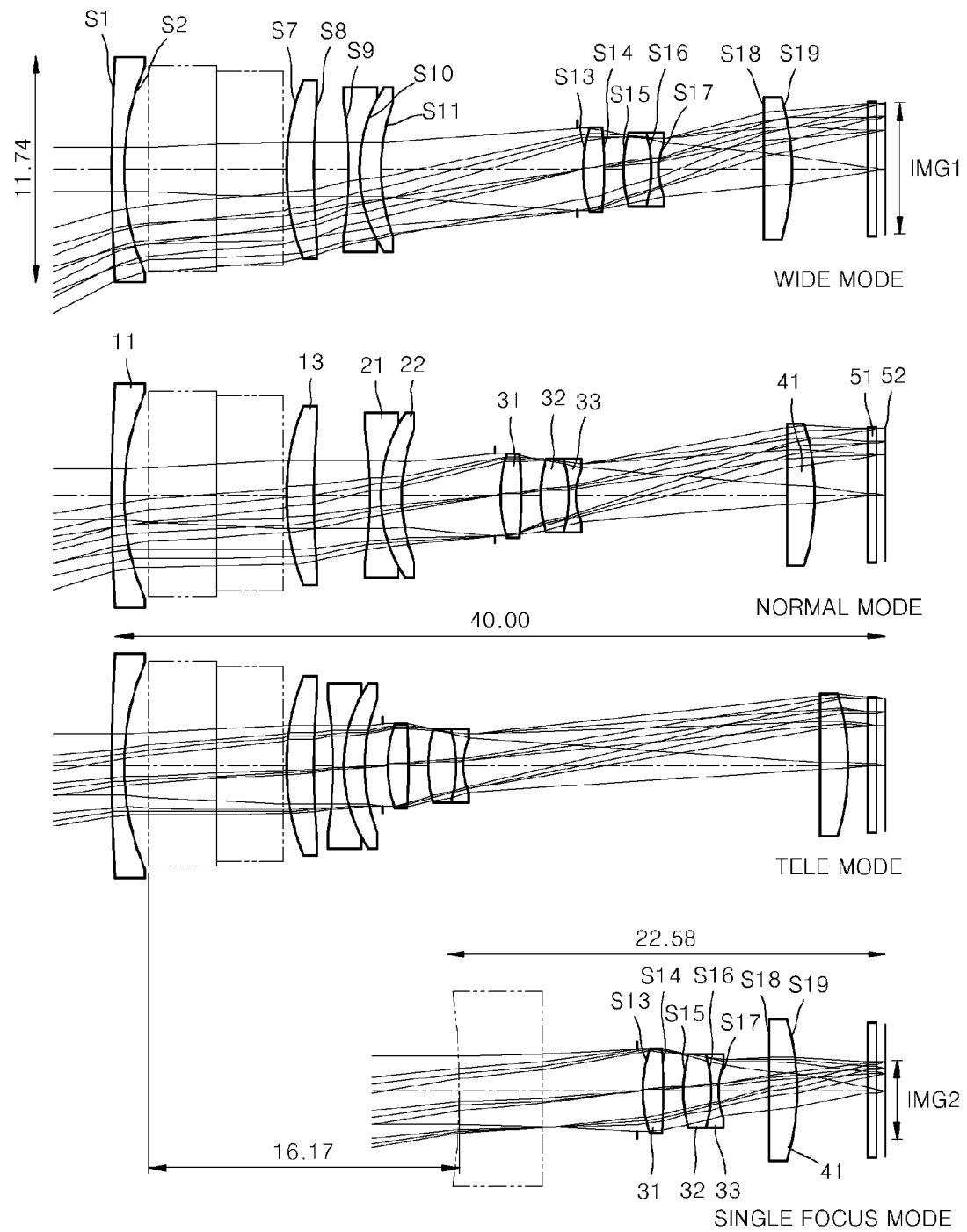
FIG. 4 is a pictorial diagram that illustrates optical paths in the wide mode, the normal mode, the tele mode, and the single focus mode of the dual lens optical system of FIG. 1.

Table 1 shows design data of the first optical system according to the embodiment illustrated in FIG. 4.

TABLE 1

First Optical System Design Data

| Lens Surface | R | D | Nd | Vd |
|---|---|---|---|---|
| OBJ | INFINITY | INFINITY | | |
| S1 | 121.031 | 0.6 | 1.92286 | 20.88 |
| S2 | 13.468 | 1.24 | | |
| S3 | INFINITY | 3.54 | 1.83400 | 37.35 |
| S4 | INFINITY | 0 | | |
| S5 | INFINITY | 3.54 | 1.83400 | 37.35 |
| S6 | INFINITY | 0.1 | | |
| S7 | 14.021 | 1.42 | 1.90366 | 31.32 |
| S8 | 48.828 | D0 | | |
| S9 | −26.574 | 0.5 | 1.49700 | 81.61 |
| S10 | 7.849 | 1.15 | 1.92286 | 20.88 |
| S11 | 10.795 | D1 | | |
| ST: | INFINITY | 0.2 | | |
| S13* | 6.943 | 1.09 | 1.82080 | 42.71 |
| S14* | −47.885 | 1.05 | | |
| S15 | 8.965 | 1.4 | 1.80420 | 46.50 |
| S16 | −8.202 | 0.4 | 1.78472 | 25.72 |
| S17 | 4.07 | D2 | | |
| S18 | 1116.49761 | 1.5 | 1.76802 | 49.24 |
| S19* | −11.635 | D3 | | |
| S20 | INFINITY | 0.5 | 1.51680 | 64.20 |
| S21 | INFINITY | | | |

In Table 1, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes the surface being an aspherical surface.

The second optical system may include three lens groups. For example, the second optical system includes a first lens group G2-1, a second lens group G2-2, and a third lens group G2-3, sequentially arranged along the optical axis from the object side toward the image side. The second optical system is a single focus optical system.

The first lens group G2-1 of the second optical system is a second reflection member 61. In the present embodiment, the second reflection member is a right-angled prism 61. The right-angled prism 61 has a reflection surface inside to refract object light OBJ2 input from the second direction to proceed toward the photographing device 52. A surface 61a of the right-angled prism 61 that is close to the object is an aspherical surface having a negative refractive power. Thus, since a separated incident lens for the second optical system is not needed, the miniaturization of an optical system may be made easy. Also, the right-angled prism 61 having an aspherical surface is advantageous in correction of aspherical aberration and astigmatism.

In the present embodiment, the reflection surface of the second reflection member 61 faces the same direction as the reflection surface of the first reflection member 12. That is, the second optical system that is a single focus optical system is used to photograph the object placed in the same direction as the first optical system.

The second reflection member 61 selectively refracts the optical axis of the object light from the second direction to proceed toward the photographing device 52. For example, when the second reflection member 61 is moved to be arranged between the second lens group G1-2 and the third lens group G1-3 (a first position), the object light OBJ2 input from the second direction is focused on the photographing device 52. When the second reflection member 61 is moved to be arranged out of the first optical system (a second position), the object light OBJ1 input from the first direction is focused on the photographing device 52.

In a second optical mode in which the second optical system is used for photography, the incident lens 11 of the first optical system is blocked by a cover 5. Thus, the object light OBJ1 input from the first direction is prevented from coming into the photographing device 52.

As illustrated in FIG. 3, a surface 261b that is the outer surface of a reflection surface of the right-angled prism that is the second reflection member is mirror-coated so that the object light input from the first direction may be prevented from proceeding toward the photographing device 52. In this case, since the cover 5 used in the embodiment of FIG. 1 is not needed, the miniaturization of an optical system may be made easy.

The second lens group G2-2 of the second optical system is the third lens group G1-3 of the first optical system. Also, the third lens group G2-3 of the second optical system is the fourth lens group G1-4 of the first optical system. That is, the first and second optical systems share two lens groups G1-3 and G1-4 and the photographing device 52, thereby contributing to the miniaturization of the whole dual lens optical system.

Table 2 shows design data of the second optical system of the embodiment of FIG. 4.

TABLE 2

Design Data of Second Optical System

| Lens Surface | R | D | Nd | Vd |
|---|---|---|---|---|
| OBJ | INFINITY | | | |
| S1* | −34.154 | 4.3 | | |
| S2 | INFINITY | 5 | | |
| — | — | — | | |
| STOP | INFINITY | 0.2 | | |
| S13* | 6.943 | 1.09 | 1.82080 | 42.71 |
| S14* | −47.885 | 1.05 | | |
| S15 | 8.965 | 1.4 | 1.80420 | 46.50 |
| S16 | −8.202 | 0.4 | 1.78472 | 25.72 |
| S17 | 4.07 | 2.55 | | |
| S18 | 1116.49761 | 1.5 | 1.76802 | 49.24 |
| S19* | −11.635 | 3.59 | | |
| S20 | INFINITY | 0.5 | 1.51680 | 64.20 |
| S21 | INFINITY | | | |

In Table 2, "R" denotes the radius of curvature, "D" denotes the thickness of a lens at the central portion thereof or the distance between lenses, "Nd" denotes the refractive index of a material, "Vd" denotes the Abbe's number of the material, and the mark "*" in the lens surface column denotes the surface being an aspherical surface.

Figure 12:
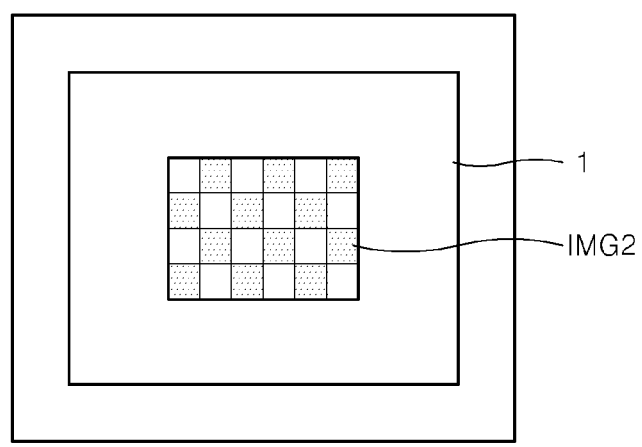
FIG. 12 is a pictorial diagram that illustrates the second region on an imaging surface where light representing an image of an object is focused when photography is performed by using the second optical system of the dual lens optical system according to the embodiments of the invention.
Figure 13:
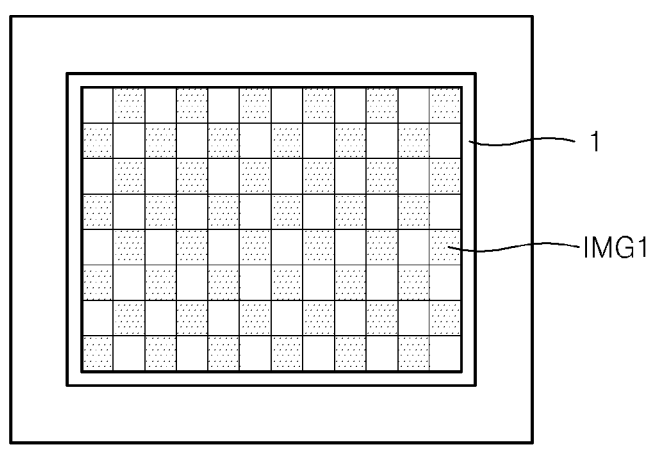
FIG. 13 is a pictorial diagram that illustrates the first region on an imaging surface where light representing an image of an object is focused when photography is performed by using the first optical system of the dual lens optical system according to the embodiments of the invention.

As it may be seen in FIGS. 4, 12, and 13, the first optical system uses a first region IMG1 of a photographing surface of the photographing device 52. That is, the object light input from the first direction through the first optical system is focused in the first region IMG1 of the photographing surface. In contrast, the second optical system uses a second region IMG2 of the photographing surface of the photographing device 52. That is, the object light input from the second direction through the second optical system is focused in the second region IMG2 of the photographing surface. The second region IMG2 overlaps the first region IMG1 to be completely included in the first region IMG1 and has a smaller size than the first region IMG1. The second optical system uses only a part of the photographing device 52, compared to the first optical system. Thus, the motion picture and/or still image photographed by the second optical system have a smaller number of pixels than the still image photographed by the first optical system.

As described above, since the motion picture whose data amount is quite larger than the still image is photographed to have a less number of pixels, an image processing speed may be increased and a lens optical system may be made miniaturized as a whole.

The lens optical system of FIG. 4 can correct spherical aberration by including at least one aspherical lens. The definition of the aspherical surface is as follows.

Assuming that the optical axis direction facing the photographing device is an x-axis, the direction perpendicular to the optical axis, that is, the direction in which object light is input through the incident lens, is a y-axis, and with a direction in which a light ray proceeds is set to be positive, the shape of an aspherical surface may be expressed by Equation 1.

$$x = \frac{c'y^2}{1 + \sqrt{1 - (K+1)c'^2 y^2}} + Ay^4 + By^6 + Cy^8 + Dy^{10} \quad \text{[Equation 1]}$$

In Equation 1, "x" denotes the distance from the apex of the lens in the optical axis direction, "y" denotes the distance in a direction perpendicular to the optical axis, "K" denotes a conic constant, "A", "B", "C", and "D" denote aspherical coefficients, and "c" denotes the reciprocal (1/R) of the radius of curvature at the apex of the lens.

Table 3 shows the aspherical coefficients in the lens optical system according to the embodiment of FIG. 4.

TABLE 3

Aspherical Coefficients in the Lens Optical System

| Lens Surface | K | A | B | C | D |
|---|---|---|---|---|---|
| S1 | 2.606380 | −4.284578E−05 | 1.861698E−06 | −7.282206E−08 | 1.079240E−09 |
| S13 | −0.921137 | 0.000000E+00 | 0.000000E+00 | 0.000000E+00 | 0.000000E+00 |
| S14 | −96.961440 | 4.521647E−05 | 0.000000E+00 | 0.000000E+00 | 0.000000E+00 |
| S19 | 1.902910 | 4.843139E−04 | −1.986718E−06 | 0.000000E+00 | 0.000000E+00 |

Table 4 shows data of variable distances during zooming in the lens optical system according to the embodiment of FIG. 1.

TABLE 4

Variable Distances During Zooming in the Lens Optical System

|  | Wide Mode | Normal Mode | Tele Mode | Single Focus Mode |
|---|---|---|---|---|
| EFL | 7.00 | 11.55 | 19.95 | 8.99 |
| 2ω | 56.52 | 33.78 | 20.02 | 37.96 |
| Fno | 3.12 | 4.25 | 6.24 | 2.48 |
| D0 | 1.825 | 2.901 | 0.964 | — |
| D1 | 10.225 | 4.867 | 1.036 | — |
| D2 | 5.45 | 10.987 | 18.461 | — |
| D3 | 3.861 | 2.605 | 0.898 | — |

In Table 4, "EFL" denotes the effective focal length of the overall lens system, "Fno" denotes the F number, "2ω" denotes the full viewing angle, "D1" denotes the distance between the first lens group G1-1 and the second lens group G1-2, "D2" denotes the distance between the second lens group G1-2 and the third lens group G1-3, "D3" denotes the distance between the third lens group G1-3 and the fourth lens group G1-4, and "D4" denotes the distance between the fourth lens group G1-4 and an infrared ray filter 51.

Figure 2:
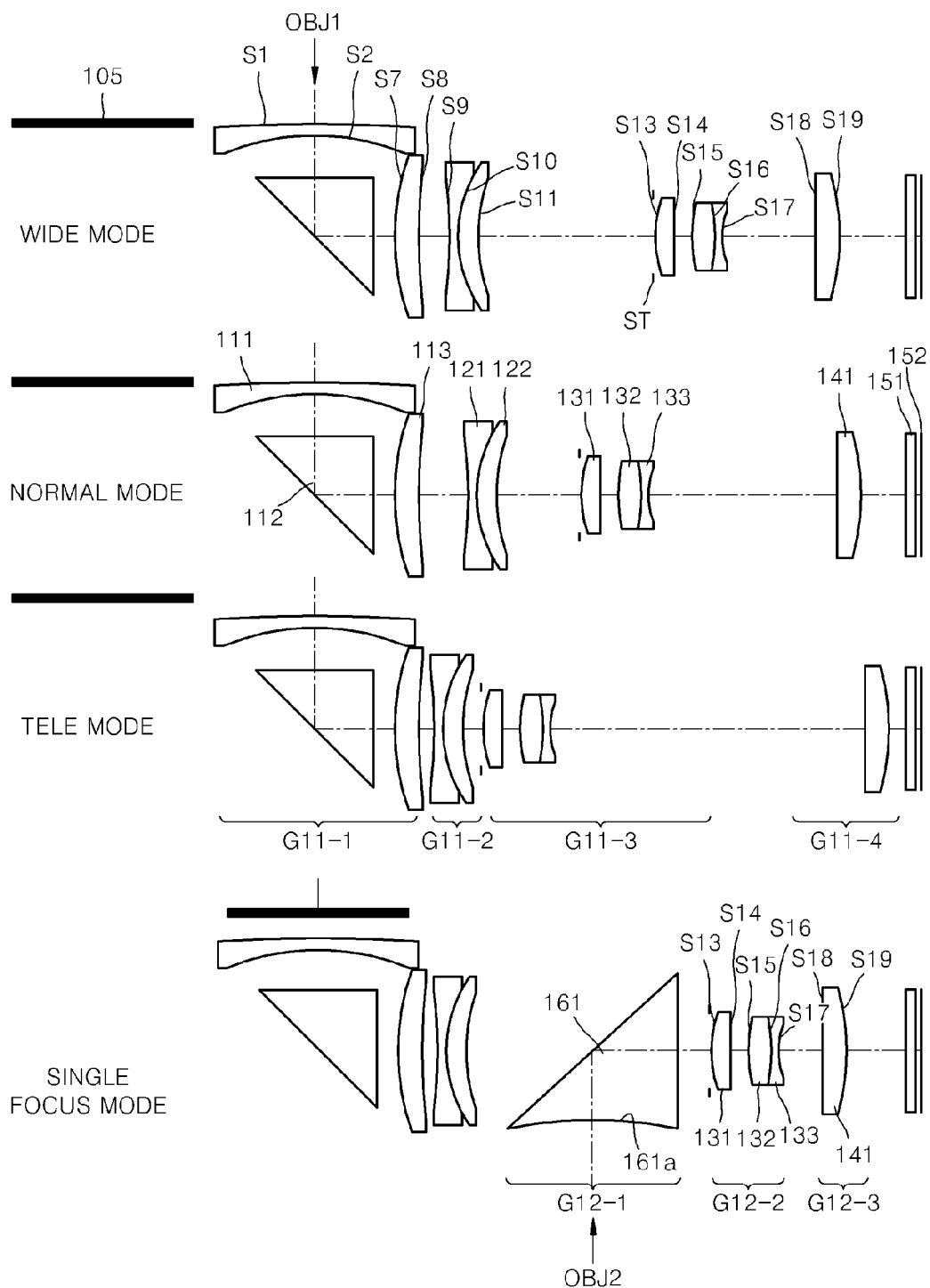
FIG. 2 is a pictorial diagram that schematically illustrates a dual lens optical system according to another embodiment of the invention, operating respectively in a wide mode, a normal mode, a tele mode, and a single focus mode.

FIGS. 2 and 3 schematically illustrate dual lens optical systems according to other embodiments of the invention, each operating respectively in a wide mode, a normal mode, a tele mode, and a single focus mode. The difference between these embodiments and the embodiment of FIG. 1 is the directions of the object lights photographed by the first optical system and the second optical system. That is, in the embodiments of FIGS. 2 and 3, the second direction that is the direction of the object light input through the second optical system is the opposite to the first direction that is the direction of the object light input through the first optical system.

In a digital camera or a camera phone employing the dual lens optical system according to the embodiments of FIGS. 2 and 3, the first optical mode may be used when a photographer photographs other objects by using the first optical system. In contrast, the second optical mode using the second optical system is used when the photographer photographs oneself for a still image or a video call.

In the present embodiment, the first and second optical modes are switched by the movements of the second reflection members 161 and 261. For example, in the second optical mode, the second reflection members 161 and 261 move toward the first position, that is, the position between the second lens groups G11-2 and G21-2 and the third lens groups G11-3 and G21-3, so that the object light OBJ2 may proceed toward photographing devices 152 and 252. In contrast, in the first optical mode, the second reflection members 161 and 261 move toward the second position so that the object light OBJ1 input from the first direction that is the opposite direction may be refracted by the first reflection members 112 and 212 and proceed toward the photographing devices 152 and 252.

The second reflection members 161 and 261 that are right-angled prisms may switch between the first and second optical modes by linearly moving between the first and second positions or by pivoting around a pivot shaft.

Also, the second optical system that is mainly used for the video call or the motion picture photography shares the photographing deices 152 and 252 used by the first optical system and generates and processes image data of a relatively low pixel for a fast time by using only the region IMG 2 of the photographing devices 152 and 252. Thus, the invention is advantageous for the miniaturization of a dual lens optical system and is suitable for the motion picture photography and the video call which requires a large amount of data to be transmitted.

FIGS. 5-8 are aberration graphs of the dual lens optical system of FIG. 4, showing aspherical aberration, astigmatism field curves, and distortion, respectively, in the wide mode, the normal mode, the tele mode, and the single focus mode.

Figure 5:
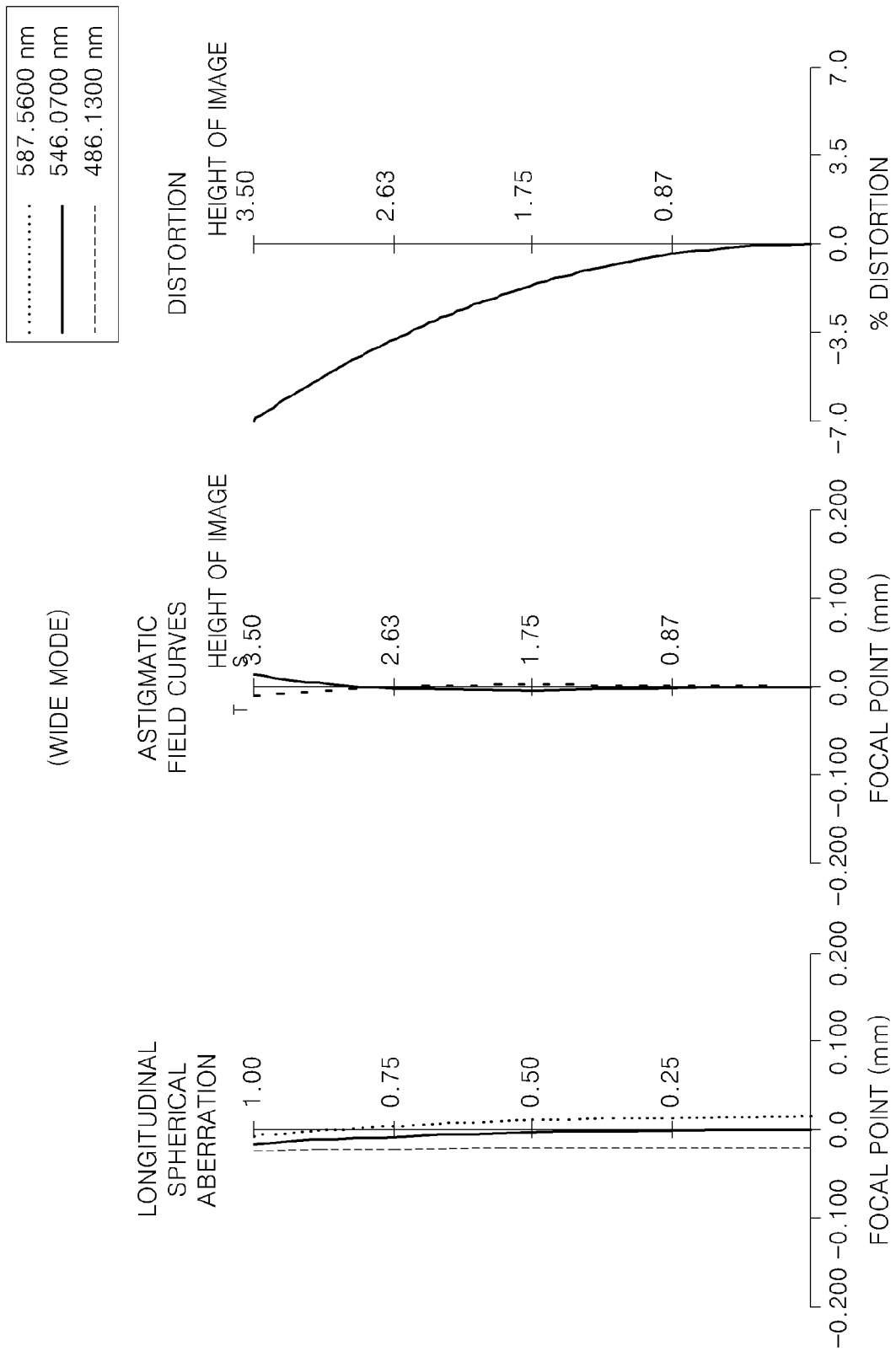
FIG. 5 is a series of aberration graphs of the dual lens optical system of FIG. 4 in the wide mode.
Figure 6:
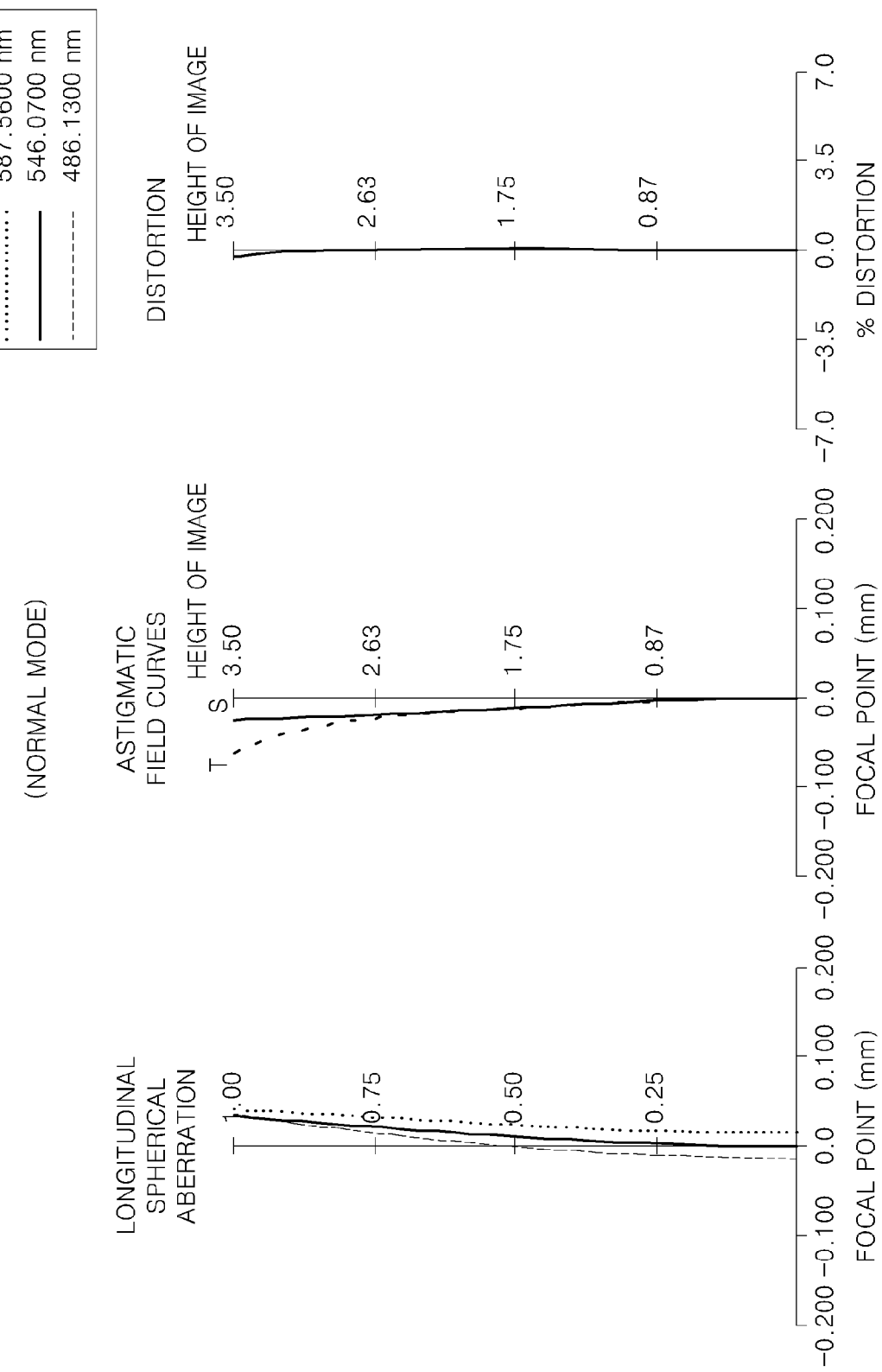
FIG. 6 is a series of aberration graphs of the dual lens optical system of FIG. 4 in the normal mode.
Figure 7:
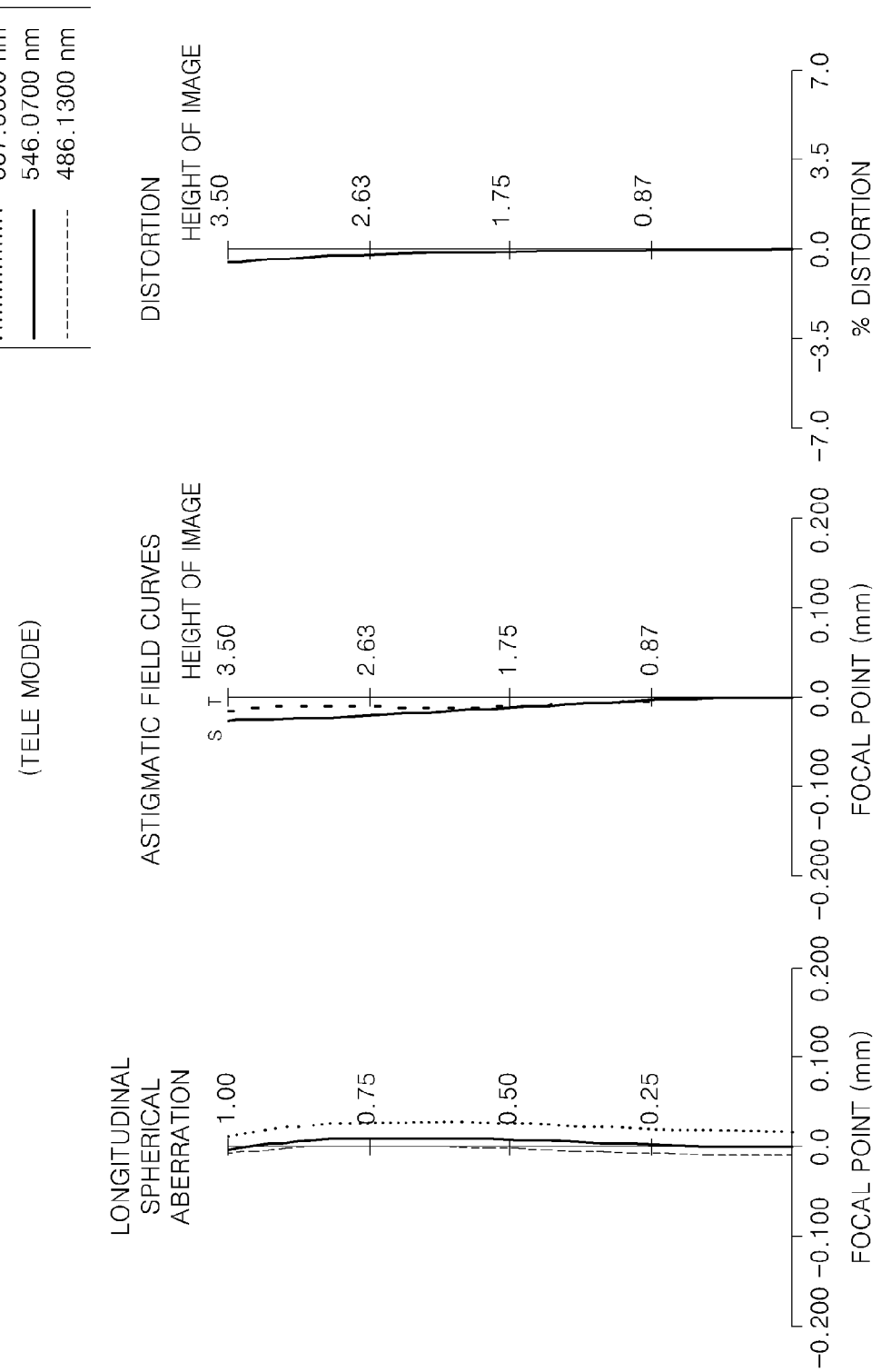
FIG. 7 is a series of aberration graphs of the dual lens optical system of FIG. 4 in the tele mode.

In the wide mode of FIG. 5, distortion increases further at the outer side of an image. However, since the distortion may be corrected to a degree by an operation process apparatus such as a digital signal processor (DSP), this may not be a problem.

Figure 8:
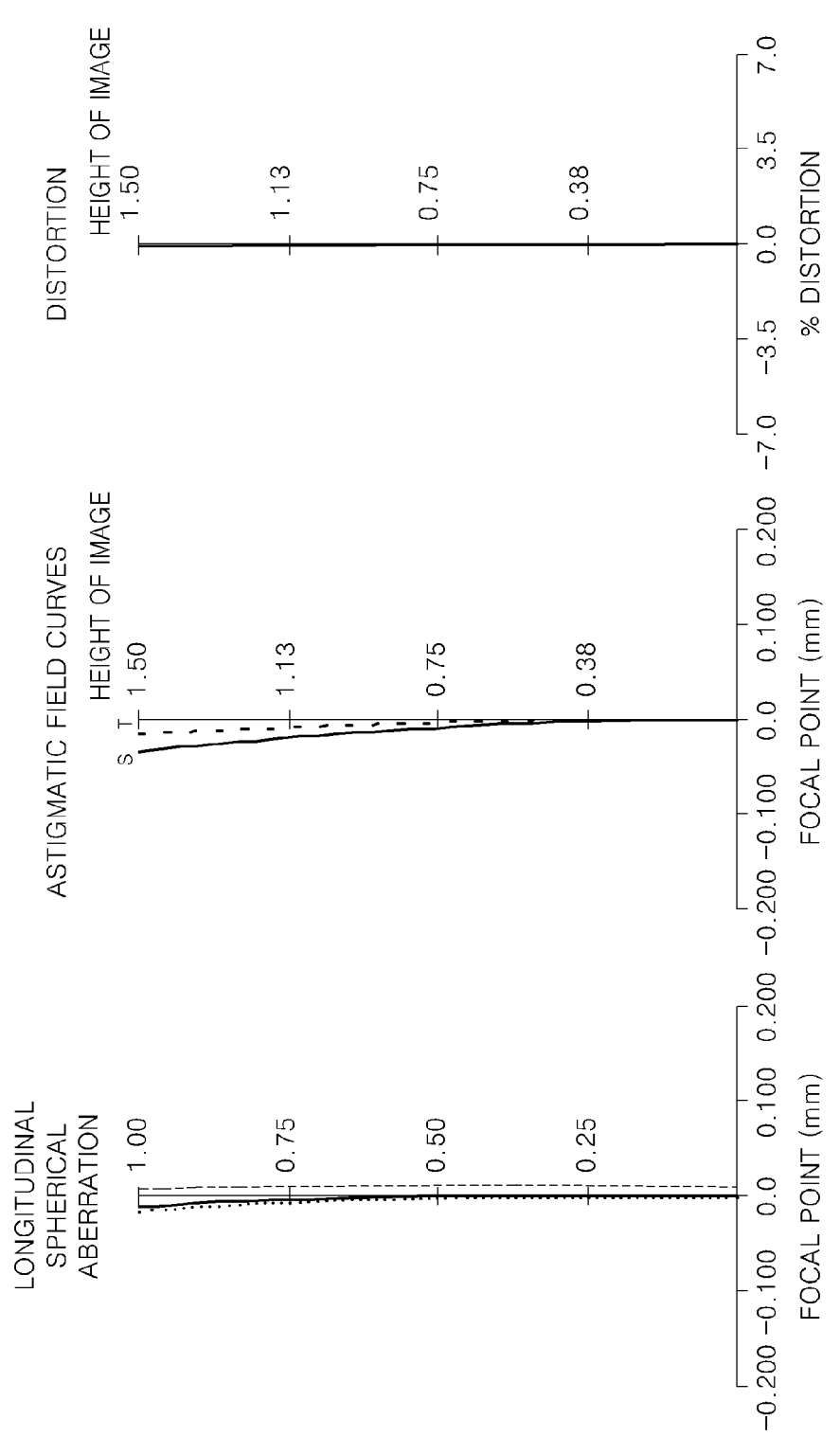
FIG. 8 is a series of aberration graphs of the dual lens optical system of FIG. 4 in the single focus mode.

Referring to the aberration graph of FIG. 8 in the single focus mode, it can be seen that, in the second optical system, the height of one side of an image formed on the photographing surface of the photographing device 52 is 1.5 mm which is much smaller than 3.5 mm in the first optical system.

Figure 9:
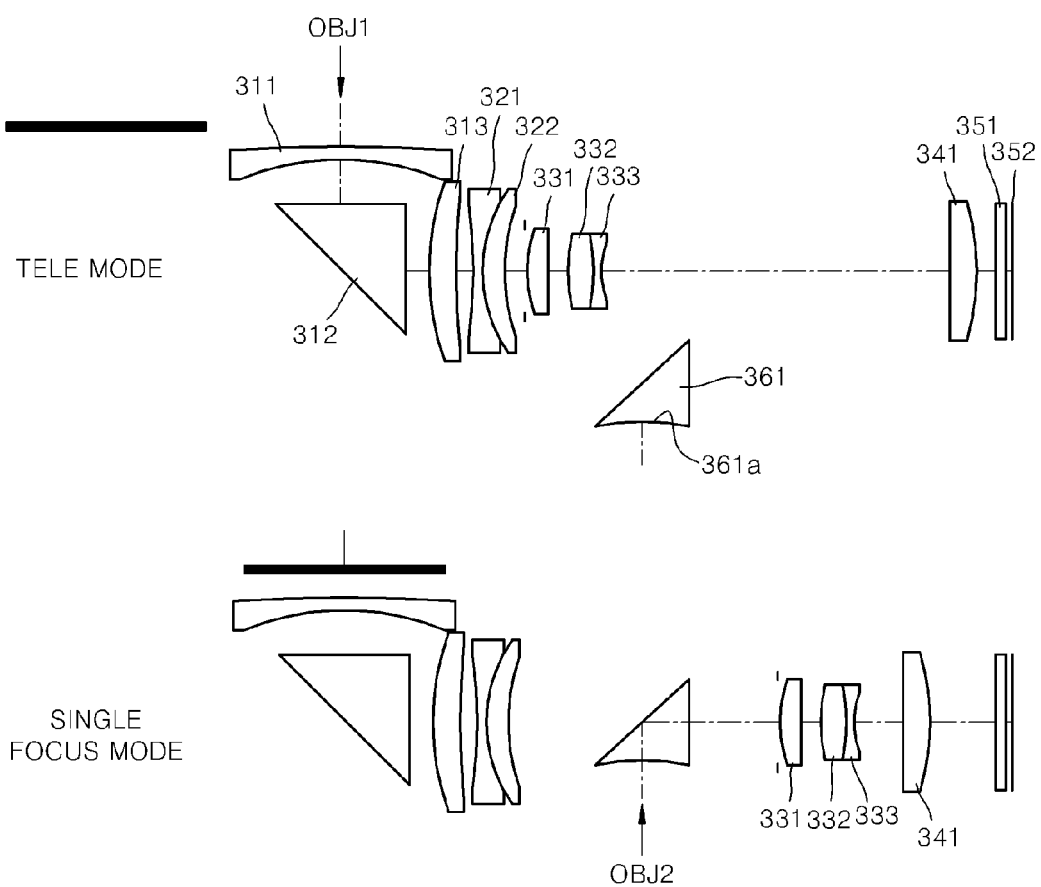
FIG. 9 is a pictorial diagram that schematically illustrates a dual lens optical system according to another embodiment of the invention, operating respectively in a wide mode, a normal mode, a tele mode, and a single focus mode.

FIG. 9 schematically illustrates a dual lens optical system according to another embodiment of the invention, operating respectively in a wide mode, a normal mode, a tele mode, and a single focus mode. Compared to the embodiment of FIG. 2, the embodiment of FIG. 9 is different in that the size of a second reflection member 361 is small. This is possible because the region IMG 2 where the object light input from the second direction through the second optical system and formed on the photographing device 352 is formed is small. That is, since the size of the right-angled prism 361 that is the second reflection member may be reduced compared to the first reflection member 312, the miniaturization of a dual lens optical system may be made easy.

FIG. 10 schematically illustrates a dual lens optical system according to another embodiment of the invention, operating respectively in a wide mode, a normal mode, a tele mode, and a single focus mode. Compared to the embodiment of FIG. 2, the embodiment of FIG. 10 is different in that the second reflection member 461 is not a right-angled prism but a movable reflection mirror. When the movable reflection mirror 461 is at the second position, since the light input from the second direction is blocked, the object light OBJ1 coming through the first optical system is formed on a photographing device 452. Also, when the movable reflection mirror 461 is at the first position, the object light OBJ2 input from the second direction is formed on the photographing device 452. A stopper 463 may be further included to guarantee accurate arrangement of the movable reflection mirror 461 at the first position.

Figure 11:
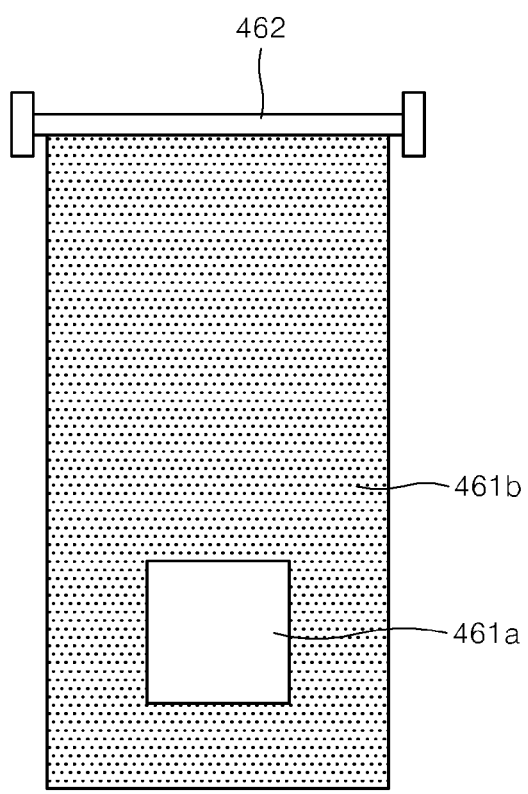
FIG. 11 is a pictorial diagram that schematically illustrates a movable reflection mirror of the dual lens optical system of FIG. 10.

FIG. 11 schematically illustrates one surface in the second direction of the movable reflection mirror 461 of the dual lens optical system of FIG. 10. A reflection surface 461a is formed in an area of a surface of the movable reflection mirror 461 and an absorption surface 461b is formed in the other area thereof. The absorption surface 461b may be coated with a black material.

FIGS. 12 and 13 illustrate the second region and the first region on an imaging surface where light representing an image of an object is focused when photography is performed by using the second and first optical systems of the dual lens optical system according to the embodiments of the invention.

As described above, when photography is performed by using the first optical system, since the whole pixel area, that is, the region IMG1, of the photographing surface 1 is used, a high pixel image may be obtained. In contrast, when photography is performed by using the second optical system, since only a partial pixel area, that is, the region IMG2, of the photographing surface 1 is used, a low pixel image may be obtained. Thus, the second optical system may improve an image processing speed and thus is suitable for, for example, a video call and motion picture photography.

In the above-described embodiments, the photographing devices 52, 152, 252, 352, and 452 convert the received object light to an electric signal for each pixel, and a charge coupled device (CCD), or a complementary metal oxide semiconductor (CMOS) may be employed therefor. The infrared ray filters 51, 151, 251, 351, and 451 may be respectively arranged before the photographing devices 52, 152, 252, 352, and 452.

The above-descried structures of lenses forming the first lens group to the fourth lens group are exemplary. The number or type of lens units may be appropriately changed by those skilled in the art, within the range of the claims of the invention, considering the optical performance or aberration.

The above-descried lens optical systems may be employed as a digital camera module in a digital camera or a mobile communications device, for example, camera phones.

Figure 14:
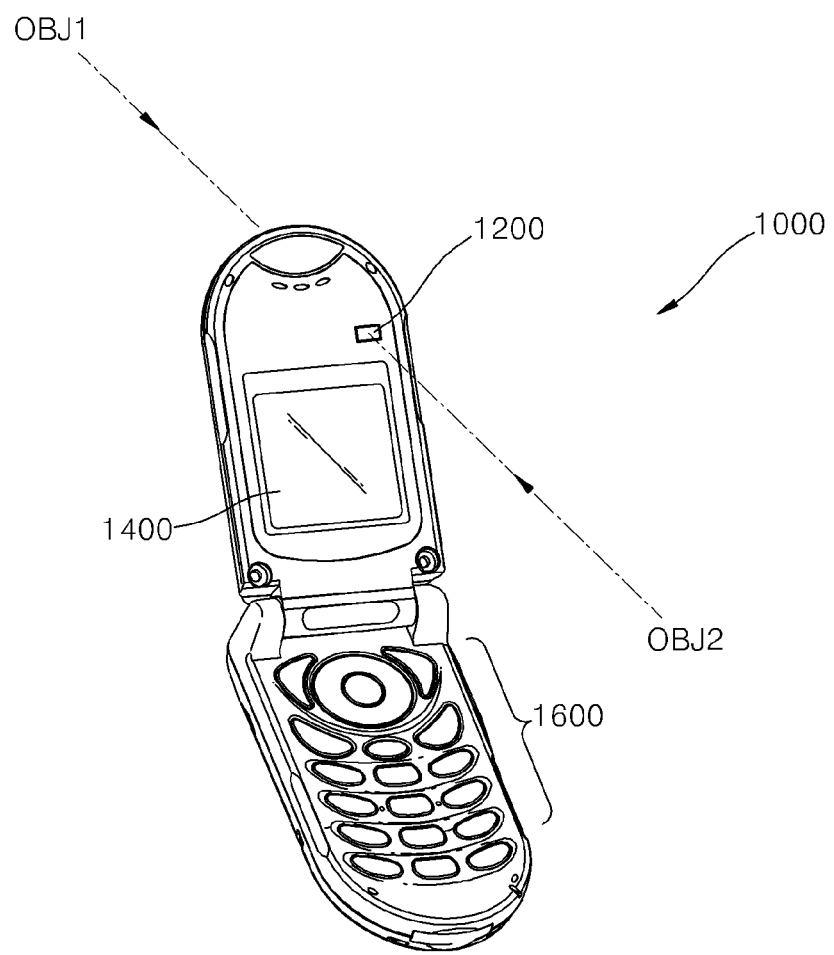
FIG. 14 is an isometric view that schematically illustrates the structure of a mobile communications device employing a digital camera module according to an embodiment of the invention.

FIG. 14 schematically illustrates the structure of a mobile communications device 1000 employing a digital camera module according to an embodiment of the invention. The mobile communications device 1000 according to the present embodiment includes a digital camera module according to the embodiment of the invention. The digital camera module includes not only the dual lens optical systems of the embodiments of the invention, but an actuating unit (not shown) actuating the second reflection members 61, 161, 261, 361, and 461 to form a structure corresponding to the selected optical mode. The mobile communications device 1000 may include a mode selection unit (not shown) selecting any one of the first and second optical modes and an image processing unit (not shown) converting the electric signal from the photographing devices 52, 152, 252, 352, and 452 to an image signal and displaying the converted signal. The selection of a mode may be performed by an input through, for example, a button unit 1600. An image processed by the image processing unit may be displayed on a screen 1400 for user's view.

A cover glass 1200 may be installed on an interior surface of the mobile communications device 1000, that is, a surface where the screen 1400 is located. When any one of the dual lens optical systems of the above-described embodiments of FIGS. 2, 3, 9, and 10 is included in the mobile communications device 1000, the light representing the image of an object is incident on the dual lens optical system through the cover glass 1200. Also, although it is not illustrated, a rear cover glass may be provided on the exterior surface of the mobile communications device 1000, that is, the rear surface of the screen 1400. In the dual lens optical systems of FIGS. 2, 3, 9, and 10, the image of any one of objects located at the opposite sides with respect to a photographing optical system may be selectively photographed without moving the photographing optical system. Thus, while viewing the screen 1400, the user may selectively photograph the object lights OBJ1 and OBJ2 located at the opposite sides of the screen 1400.

The mobile communications device 1000 of the present embodiment may be applied as, for example, mobile communications devices capable of making a video call and photographing an image with a single camera module. That is, in a video call mode or a self photographing mode, by selecting the second optical mode, the user may photograph the image of the user while viewing the image of a call receiver or the image of the user (OBJ2) displayed on the screen 1400. In a general photographing mode, the user may photograph the image of other object (OBJ1) displayed on the screen 1400 while viewing the object.

While the photographing optical system according to the invention and the mobile communications device employing the photographing optical system have been particularly shown and described with reference to exemplary embodiments thereof, it will be understood by those skilled in the art that various changes in form and details may be made therein without departing from the spirit and scope of the invention as defined by the appended claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of components configured to perform the specified functions. The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the invention.

What is claimed is:

1. A dual lens optical system comprising:
   a photographing device;
   a first optical system having a first reflection member and a lens group, and that redirects an optical axis of light representing an image of an object input from a first direction toward the photographing device; and
   a second optical system having a second reflection member and that redirects an optical axis of light representing an image of an object input from a second direction toward the photographing device, and that shares the lens group of the first optical system,
   wherein the first and second optical systems selectively redirect the light representing the image of the object input from the first or second direction toward the photographing device, and
   a first region of a photographing surface where the light representing the image of the object input through the first optical system is formed and a second region of the photographing surface where the light representing the image of the object input through the second optical system is formed have different sizes and are overlapped with each other.

2. The dual lens optical system of claim 1, wherein the second reflection member is selectively moved to a first position or a second position to redirect the light representing the image of the object input in the first or second direction toward the photographing device.

3. A dual lens optical system comprising:
   a photographing device;
   a first optical system having a first reflection member and that redirects an optical axis of light representing an image of an object input from a first direction toward the photographing device; and
   a second optical system having a second reflection member and that redirects an optical axis of light representing an image of an object input from a second direction toward the photographing device, and that shares at least one of optical elements of the first optical system, wherein the second reflection member is a prism having a reflection surface, in which an incident surface is an aspherical surface,
   wherein the first and second optical systems selectively redirect the light representing the image of the object input from the first or second direction toward the photographing device,
   a first region of a photographing surface where the light representing the image of the object input through the first optical system is formed and a second region of the photographing surface where the light representing the image of the object input through the second optical system is formed have different sizes and are overlapped with each other, and the second reflection member is selectively moved to a first position or a second position to redirect the light representing the image of the object input in the first or second direction toward the photographing device.

4. The dual lens optical system of claim 3, wherein the second reflection member is arranged closest to the object in the second optical system to function as an incident lens.

5. The dual lens optical system of claim 3, wherein an opposite surface of the reflection surface of the second reflection member is mirror-coated to reflect light coming in an opposite direction.

6. The dual lens optical system of claim 2, wherein the second reflection mirror is a movable reflection mirror having a reflection surface and an aspherical lens is further arranged at a side of the movable reflection mirror close to the object in the second direction.

7. The dual lens optical system of claim 3, wherein the reflection surface of the second reflection member is smaller than a reflection surface of the first reflection member.

8. The dual lens optical system of claim 6, wherein the reflection surface of the second reflection member is smaller than a reflection surface of the first reflection member.

9. The dual lens optical system of claim 1, wherein the second region is in the first region.

10. A dual lens optical system comprising:
a photographing device;
a first optical system having a first reflection member and that redirects an optical axis of light representing an image of an object input from a first direction toward the photographing device, wherein the first optical system comprises, in order from an object side to an image side along the optical axis, a first lens group having the first reflection member for redirecting light representing the object input from the first direction toward the photographing device, a second lens group having a negative refractive power, a third lens group having a positive refractive power, and a fourth lens group having a positive refractive power; and
a second optical system having a second reflection member and that redirects an optical axis of light representing an image of an object input from a second direction toward the photographing device, and that shares at least one of optical elements of the first optical system,
wherein the first and second optical systems selectively redirect the light representing the image of the object input from the first or second direction toward the photographing device, and
a first region of a photographing surface where the light representing the image of the object input through the first optical system is formed and a second region of the photographing surface where the light representing the image of the object input through the second optical system is formed have different sizes and are overlapped with each other.

11. The dual lens optical system of claim 10, wherein the first optical system is a zoom optical system and, during zooming from a wide mode to a tele mode, the second lens group moves toward the photographing device and then toward the object, the third lens group moves toward the object, and the fourth lens group moves toward the photographing device, and the fourth lens group performs focusing.

12. The dual lens optical system of claim 10, wherein the second optical system comprises, in order from the object side to the image side along the optical axis, a first lens group having a second reflection member for redirecting light representing the object input from the second direction toward the photographing device, a second lens group having a positive refractive power, and a third lens group having a positive refractive power.

13. The dual lens optical system of claim 12, wherein the shared optical elements are the third and fourth lens groups of the first optical system, and the third and fourth lens groups of the first optical system are the second and third lens groups of the second optical system.

14. The dual lens optical system of claim 11, wherein the second optical system is a single focus optical system, and a focal length of the second optical system is longer than a focal length of the first optical system in a wide mode and shorter than a focal length of the first optical system in a normal mode.

15. The dual lens optical system of claim 1, wherein the second optical system is used for photographing at least one of a motion picture and a still image.

16. The dual lens optical system of claim 1, wherein the first direction and the second direction face the opposite directions on axes that are not the same.

17. The dual lens optical system of claim 1, wherein the first direction and the second direction face the same direction on axes that are not the same.

18. The dual lens optical system of claim 1, wherein a cover for selectively blocking light input from the first direction is arranged at an object side of the first reflection member.

19. A digital camera module comprising the first and second optical systems of claim 1, the first optical system being used in a still image photography mode and the second optical system being used in a motion picture photography mode.

* * * * *